United States Patent
Ritter

(10) Patent No.: US 7,083,194 B2
(45) Date of Patent: Aug. 1, 2006

(54) GAS BAG FOR A VEHICLE OCCUPANT RESTRAINT SYSTEM

(75) Inventor: Philipp Ritter, Schwäbisch Gmünd (DE)

(73) Assignee: TRW Occupant Restraint Systems GmbH & Co. KG, Alfdorf (DE)

( * ) Notice: Subject to any disclaimer, the term of this patent is extended or adjusted under 35 U.S.C. 154(b) by 379 days.

(21) Appl. No.: 10/425,243

(22) Filed: Apr. 29, 2003

(65) Prior Publication Data
US 2003/0201631 A1 Oct. 30, 2003

(30) Foreign Application Priority Data
Apr. 30, 2002 (DE) ................... 202 06 888 U

(51) Int. Cl.
*B60R 21/16* (2006.01)

(52) U.S. Cl. .................................... 280/743.1
(58) Field of Classification Search ............. 280/743.1, 280/732, 728.1
See application file for complete search history.

(56) References Cited

U.S. PATENT DOCUMENTS

| 5,316,337 | A | | 5/1994 | Yamaji et al. |
| 5,720,234 | A | * | 2/1998 | Hammer .......... 112/475.08 |
| 5,855,393 | A | * | 1/1999 | Keshavaraj ........ 280/743.1 |
| 5,865,467 | A | * | 2/1999 | Bito et al. ......... 280/743.1 |
| 5,931,498 | A | * | 8/1999 | Keshavaraj ........ 280/743.1 |
| 5,957,486 | A | | 9/1999 | Taguchi et al. |
| 6,129,382 | A | | 10/2000 | Tonooka |
| 6,439,606 | B1 | * | 8/2002 | Okada et al. ...... 280/743.1 |

FOREIGN PATENT DOCUMENTS

| DE | 4324487 | 1/1995 |
| JP | 07125593 | 5/1995 |

\* cited by examiner

*Primary Examiner*—Faye M. Fleming
(74) *Attorney, Agent, or Firm*—Tarolli, Sundheim, Covell & Tummino L.L.P.

(57) ABSTRACT

A gas bag consists of an upper piece, a front piece and a rear piece, which each have a generally hexagonal shape with a first half and a second half. The first half of the upper piece is congruent with the second half of the rear piece and connected therewith along three outer edges thereof. The first half of the rear piece is congruent with the second half of the front piece and connected therewith along three outer edges thereof. The first half of the front piece is congruent with the second half of the upper piece and connected therewith along three outer edges thereof.

13 Claims, 4 Drawing Sheets

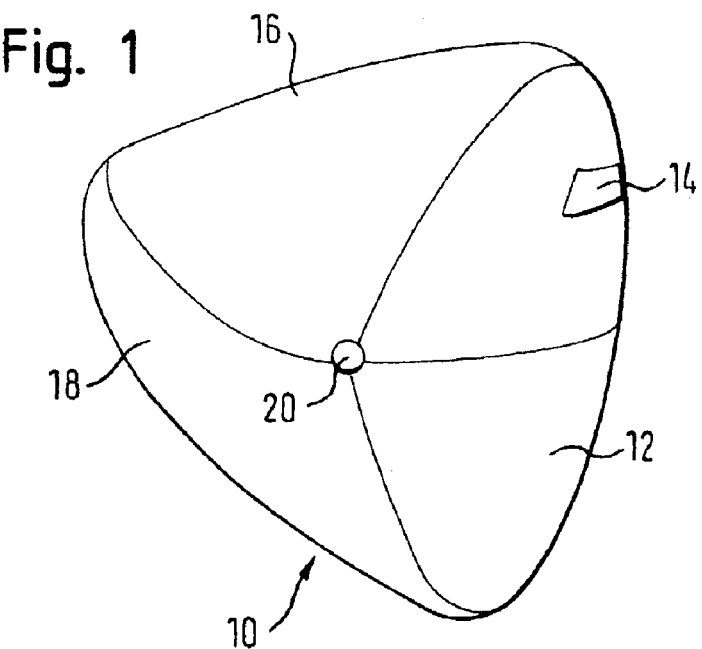
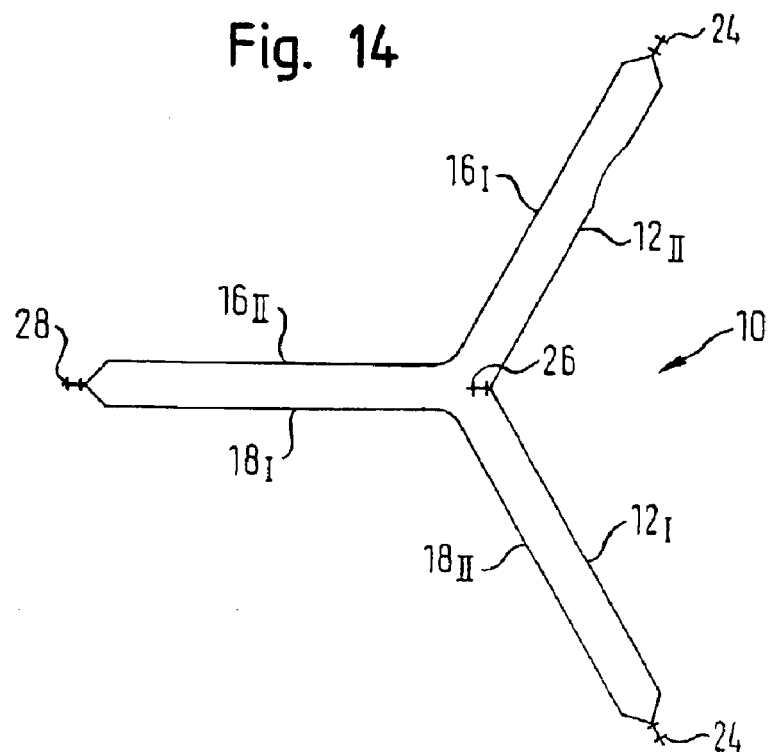

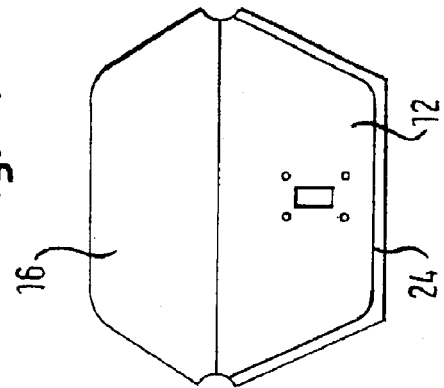
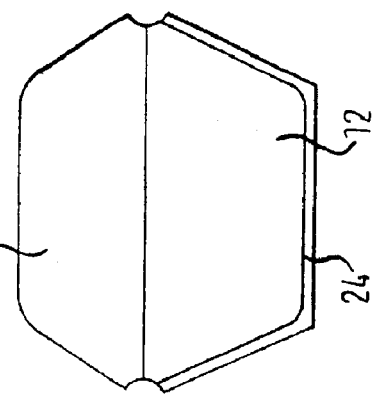
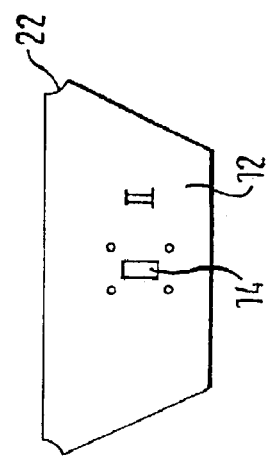
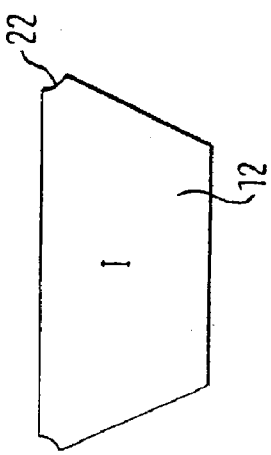
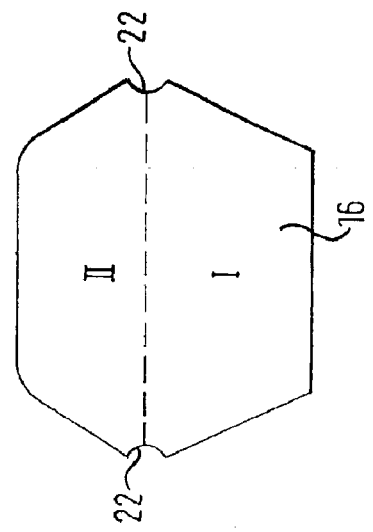
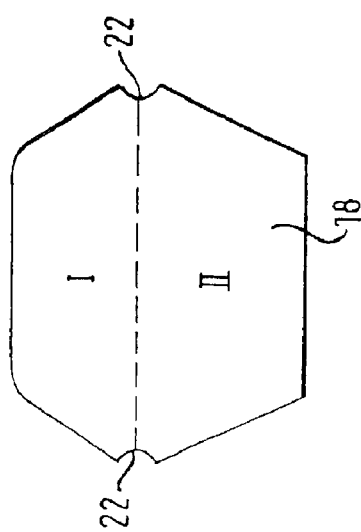

GAS BAG FOR A VEHICLE OCCUPANT RESTRAINT SYSTEM

TECHNICAL FIELD

The invention relates to a gas bag for a vehicle occupant restraint system, in particular for restraining a passenger.

BACKGROUND OF THE INVENTION

A passenger's gas bag usually has a distinctly three-dimensional form in the unfolded state, so that on the one hand there is as large an area as possible facing the passenger who is to be restrained, which area offers a restraining effect for the head, the upper body and as far as possible also for the knees or upper thighs, and on the other hand a great depth is reached, which makes possible a large restraint path. Such a distinctly three-dimensional form may be obtained, for example, in that an encircling cover part is used, which extends upwards from the instrument panel, then forwards and downwards on the side facing the vehicle occupant, and finally back to the instrument panel, and that laterally separate side pieces are applied. In order to obtain the desired three-dimensional form of the gas bag, the side pieces must be cut so as to be kidney-shaped. This leads to a high degree of wastage. In addition, the side pieces can not be sewn by machine to the cover part, because the fabric pieces can not be clamped in a flat sewing material holder. Therefore, the fabric pieces have to be sewn by hand, which leads to high manufacturing costs.

The object of the invention consists in providing a gas bag with a distinctly three-dimensional form, the fabric pieces of which have a shape such that a low amount of wastage results, and which are sewn by means of flat seams, so that the fabric pieces can be sewn by machine.

BRIEF SUMMARY OF THE INVENTION

According to the invention, a gas bag consists of an upper piece, a front piece and a rear piece, which each have a generally hexagonal shape with a first half and a second half. The first half of the upper piece is congruent with the second half of the rear piece and connected therewith along three outer edges thereof. The first half of the rear piece is congruent with the second half of the front piece and connected therewith along three outer edges thereof. The first half of the front piece is congruent with the second half of the upper piece and connected therewith along three outer edges thereof. Thus, the gas bag consists exclusively of hexagonal fabric pieces which can be cut out from a web of fabric without a high degree of waste. As the individual fabric pieces have edge sections running in a straight line, they can be connected with each other by machine in a simple manner, for example sewn or woven together.

In the region of the transition from the first to the second half on the upper piece, on the front piece and on the rear piece, one notch each can be provided instead of a corner, so that with minimal effort two outflow openings are formed.

According to a preferred embodiment of the invention, provision is made that the rear piece consists of two separate partial pieces which are sewn together. This facilitates the sewing of the various parts of the gas bag.

Advantageous developments of the invention will be apparent from the sub-claims.

BRIEF DESCRIPTION OF THE DRAWINGS

FIG. 1 shows a gas bag according to the invention in a perspective view;

FIG. 2 shows the upper piece of the gas bag of FIG. 1 in a top view;

FIG. 3 shows one half of the rear piece of the gas bag of FIG. 1 in a top view;

FIG. 4 shows the two fabric pieces of FIGS. 2 and 3 in the state when sewn together, in a top view;

FIG. 5 shows the two fabric pieces of FIGS. 2 and 3 in the state when sewn together, in a sectional view;

FIG. 6 shows the front piece of the gas bag of FIG. 1 in a top view;

FIG. 7 shows another half of the rear piece of the gas bag of FIG. 1 in a top view;

FIG. 8 shows the two fabric pieces of FIGS. 6 and 7 in the state when sewn together, in a top view;

FIG. 9 shows the two fabric pieces of FIGS. 6 and 7 in the state when sewn together, in a sectional view;

FIG. 14 shows the completely sewn gas bag in a further sectional view;

DETAILED DESCRIPTION OF THE PREFERRED EMBODIMENTS

Figure 10:
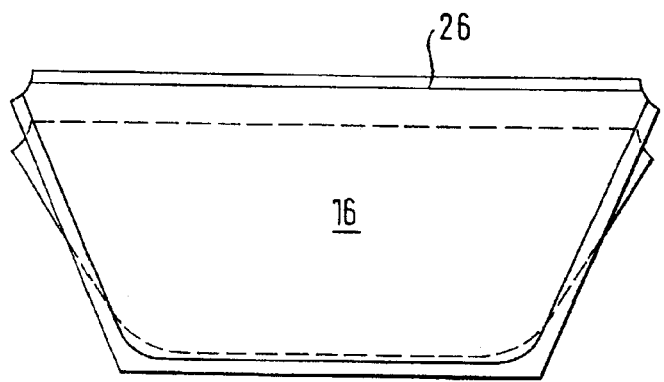
FIG. 10 shows the fabric pieces of FIGS. 4 and 8, sewn together, in a top view.

In FIG. 1 a three-dimensional gas bag 10 is shown, which is meant to be used in particular in a passenger's gas bag module. The gas bag consists of a rear piece 12, an upper piece 16 and a front piece 18. In the rear piece 12 an inflation opening 14 is provided, through which compressed gas can be introduced into the gas bag in order to unfold it. At the point of intersection between the rear piece 12, the upper piece 16 and the front piece 18, an outflow opening 20 is provided. A further outflow opening is present on the side of the gas bag 10 which is not visible in FIG. 1.

In FIG. 2 the upper piece 16 is shown, which is a flat fabric piece having a generally hexagonal shape and straight edges. To facilitate the following description, the upper piece is divided into an imaginary first half I and second half II. At the transition between the first and the second halves, the corners which are actually present are missing, because one notch 22 each is provided. Some of the remaining corners are rounded.

In FIG. 3 one half of the rear piece 12 is shown, and namely the second half. The first half is shown in FIG. 7. The two halves together produce a flat, generally hexagonal fabric piece, in which in a similar manner to the upper piece 16 two notches are provided at the transition between the first and second halves. It is important that the second half of the rear piece 12 is congruent with the first half of the upper piece 16.

In FIGS. 4 and 5 the upper piece 16 and the second half of the rear piece 12 are shown in the state when sewn together. A seam 24 is formed along the three common outer edges of the two fabric pieces, so that a pocket-like intermediate product results. As the two fabric pieces are flat and the three seam sections run each in a straight line, the seam 24 can be made without great effort, in particular by machine.

In FIG. 6 the front piece 18 is shown, which in the same manner as the upper piece 16 is a flat fabric piece having a generally hexagonal shape and straight edges. The front piece is also divided into an imaginary first half I and second half II, and two notches 22 are provided. The first half of the front piece 18 is congruent with the second half of the upper piece 16. The second half of the front piece 18 is congruent with the first half of the rear piece 12 shown in FIG. 7.

In FIGS. 8 and 9 it can be seen that the first half of the rear piece 12 and the second half of the front piece 18 are sewn together in the same manner as the second half of the rear piece 12 with the first half of the upper piece 16. Here, also, a pocket-like intermediate product is formed, in which the seam 24 extends in three sections along the common edges of the two fabric pieces.

Figure 11:
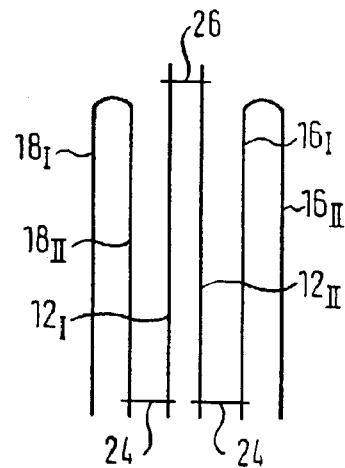
FIG. 11 shows the fabric pieces of FIG. 10 in a sectional view.

In FIGS. 10 and 11 the two intermediate products of FIGS. 4 and 5 are shown on the one hand and of FIGS. 8 and 9 on the other hand, in a state when connected with each other. For this purpose, the two halves of the rear piece 12 are placed one on the other along their free edges (in FIGS. 3 and 7 the horizontal upper edges) and are sewn together by a seam 26. Here, the free sections of the upper piece 16 and of the front piece 18, i.e. the second half of the upper piece 16 and the first half of the front piece 18, are folded away in downward direction, so that the edges of the two halves of the rear piece 12 are freely accessible.

Alternatively the rear piece 12 can also be constructed in one piece. This saves the seam 26, but increases the effort on sewing the rear piece 12 to the upper piece 16 and to the front piece 18.

Figure 12:
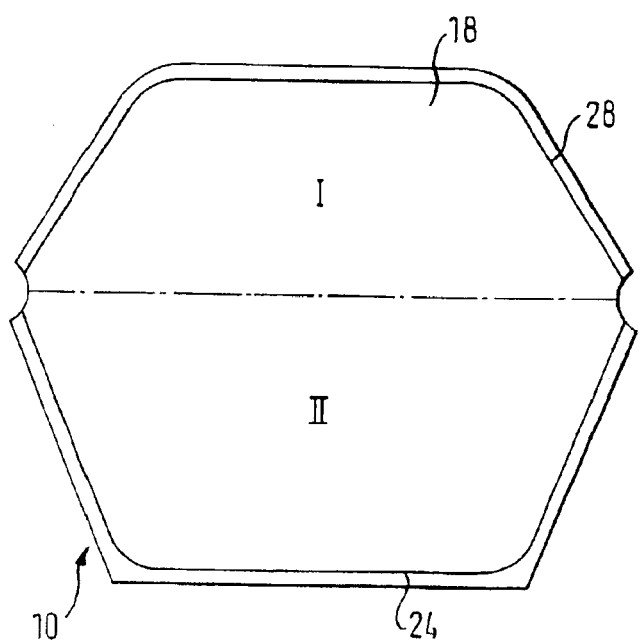
FIG. 12 shows the completely sewn gas bag in a top view.
Figure 13:
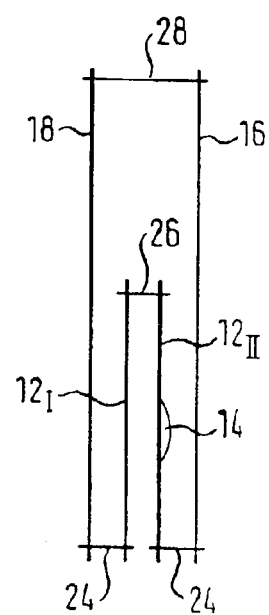
FIG. 13 shows the gas bag of FIG. 12 in a sectional view.

In FIGS. 12 and 13, the completely sewn gas bag is shown. In order to obtain a fully closed gas bag, starting from the intermediate state according to FIGS. 10 and 11, the second half of the upper piece 16 and the first half of the front piece 18 need only to be folded upwards, so that their free edges lie one on the other. These are then connected to each other by a flat seam 28, which in turn has three sections running in a straight line.

Owing to the notches 22, two outflow openings 20 are formed in those regions of the gas bag where three fabric pieces meet each other in each case. If no outflow openings are required, the corresponding corners of the fabric pieces may also be sewn in a tight manner by the seams 24, 26, 28.

The described gas bag can be produced easily, because it consists exclusively of flat fabric pieces with straight edges. The three-dimensional form of the gas bag can be set by the specific shape of the individual halves of the front piece, upper piece and rear piece. Here, it is only to be noted that the second half of the upper piece 16 is congruent with the first half of the front piece 18, that the second half of the front piece 18 is congruent with the first half of the rear piece 12 and that the second half of the rear piece 12 is congruent with the first half of the upper piece 16.

In FIG. 14, the gas bag 10 is shown in a star-shaped form. It can be seen that it can be folded flat in various ways. Each arm formed from two different halves of the second fabric pieces can be folded flat onto the adjacent arm.

According to requirements, different materials can be used for the various fabric pieces. For the fabric pieces which are folded into the interior of the gas bag, i.e. with the folding according to FIG. 13 for the rear piece 12, an uncoated fabric presents itself.

Figure 15:
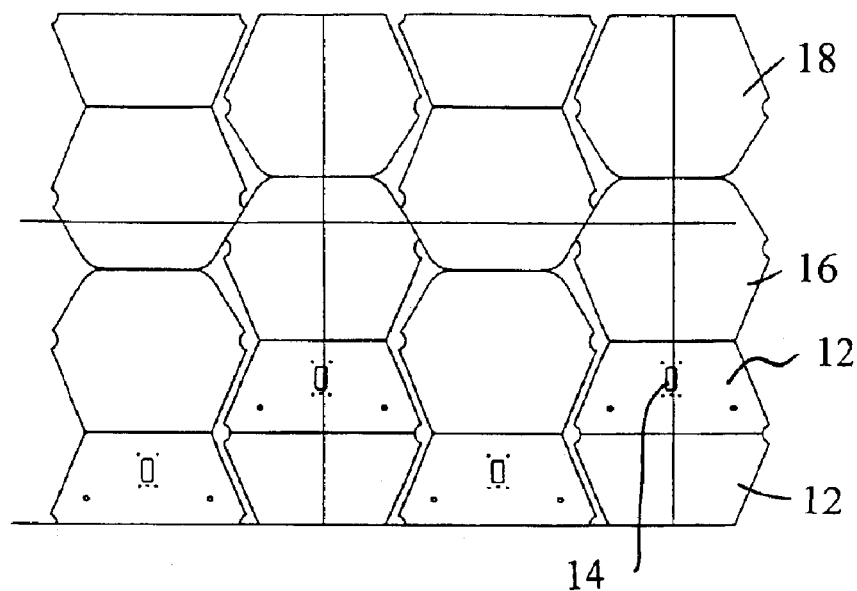
FIG. 15 is a top view of a first web of fabric which shows cut lines for the fabric pieces of a gas bag according to the invention.

In FIG. 15 there are shown cut lines along which the fabric pieces for the gas bag according to the invention can be cut out of the web of fabric. It is to be seen that only low waste will be produced.

Figure 16:
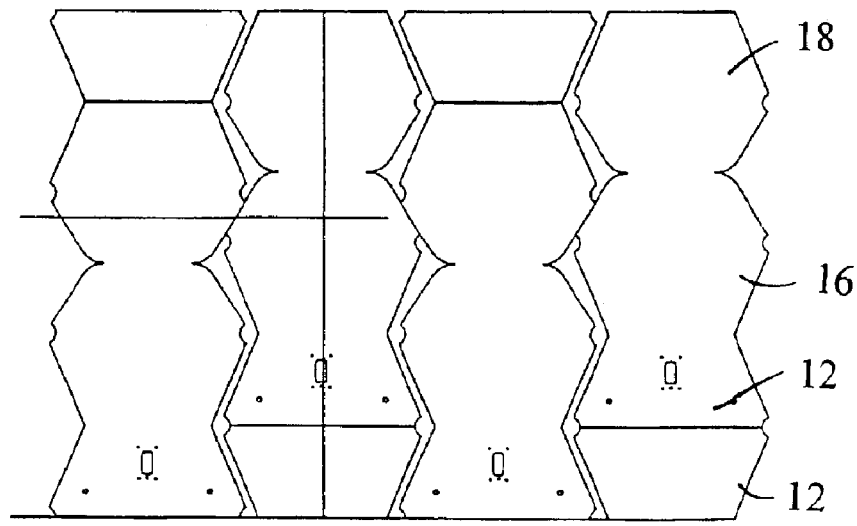
FIG. 16 is a top view of a second web of fabric which shows cut lines for the fabric pieces of a gas bag of the invention according to a further embodiment.

In FIG. 16 there are shown cut lines along which the fabric pieces for the gas bag according to a further embodiment can be cut out of one and the same web of fabric. The difference to the embodiment according to FIG. 15 is that there are not four individual fabric pieces that have to be cut out and sewn to each other, but rather only two fabric pieces. In fact, the upper piece 16 and the front piece 18 are integrally formed with each other and the half 12II of the rear piece provided with the inflation opening 14 likewise joins the upper piece 16 in one piece. It is only the second half 12I of the rear part which is cut out separately. Apart from the reduced expense for cutting to size, there will be considerable savings in cost on sewing the pieces together.

What is claimed is:

1. A gas bag having three pieces centered on a center line, said three pieces consisting of an upper piece, a front piece and a rear piece, which each have a generally hexagonal shape with a first half having a terminal end centered on said center line and a second half having a terminal end centered on said center line, said first half of said upper piece being congruent with said second half of said rear piece and connected therewith along three outer edges thereof, said first half of said rear piece being congruent with said second half of said front piece and connected therewith along three outer edges thereof, and said first half of said front piece being congruent with said second half of said upper piece and connected therewith along three outer edges thereof.

2. The gas bag according to claim 1, wherein in a region of a transition from said first to said second half on said upper piece and said front piece and said rear piece, a notch is provided instead of a corner, so that two outflow openings are formed.

3. The gas bag according to claim 1, wherein in said second half of said rear piece an opening is provided, through which compressed gas can be introduced into said gas bag.

4. The gas bag according to claim 1, wherein in said second half of said rear piece an opening is provided, which serves to receive a gas bag module.

5. The gas bag according to claim 1, wherein said rear piece consists of two separate partial pieces which are sewn together.

6. The gas bag according to claim 1 wherein said upper piece and said front piece are formed integrally with each other.

7. The gas bag according to claim 1, wherein a portion of said rear piece is integrally formed with said upper piece.

8. The gas bag according to claim 1, wherein said fabric pieces are connected with each other by seams.

9. The gas bag according to claim 8, wherein each seam is formed along the three outer edges common to two of said fabric pieces.

10. The gas bag according to claim 9, wherein each seam extends in three sections.

11. The gas bag according to claim 10, wherein each of said sections runs in a substantially straight line.

12. A gas bag consisting of an upper piece, a front piece and a rear piece, which each have a generally hexagonal shape with a first half and a second half, said first half of said upper piece being congruent with said second half of said rear piece and interwoven therewith along three outer edges thereof, said first half of said rear piece being congruent with said second half of said front piece and interwoven therewith along three outer edges thereof, and said first half of said front piece being congruent with said second half of said upper piece and interwoven therewith along three outer edges thereof.

13. A gas bag consisting of an upper piece, a front piece and a rear piece, which each have a generally hexagonal shape with a first half and a second half, said first half of said upper piece being congruent with said second half of said rear piece and connected therewith by individual threads that extend through both of said upper and rear pieces along three outer edges thereof, said first half of said rear piece being congruent with said second half of said front piece and connected therewith by individual threads that extend through both of said front and rear pieces along three outer edges thereof, and said first half of said front piece being congruent with said second half of said upper piece and connected therewith by individual threads that extend through both of said front and upper pieces along three outer edges thereof.

\* \* \* \* \*